Oct. 16, 1928.
J. L. LIMERES
1,688,243
MACHINE FOR ROUNDING GEAR WHEELS
Filed June 15, 1927
2 Sheets-Sheet 1
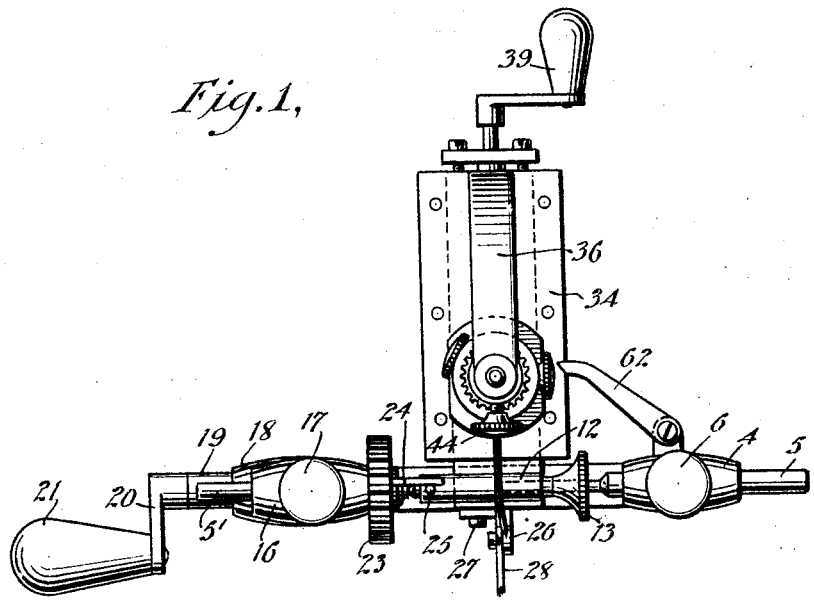
Fig.1,
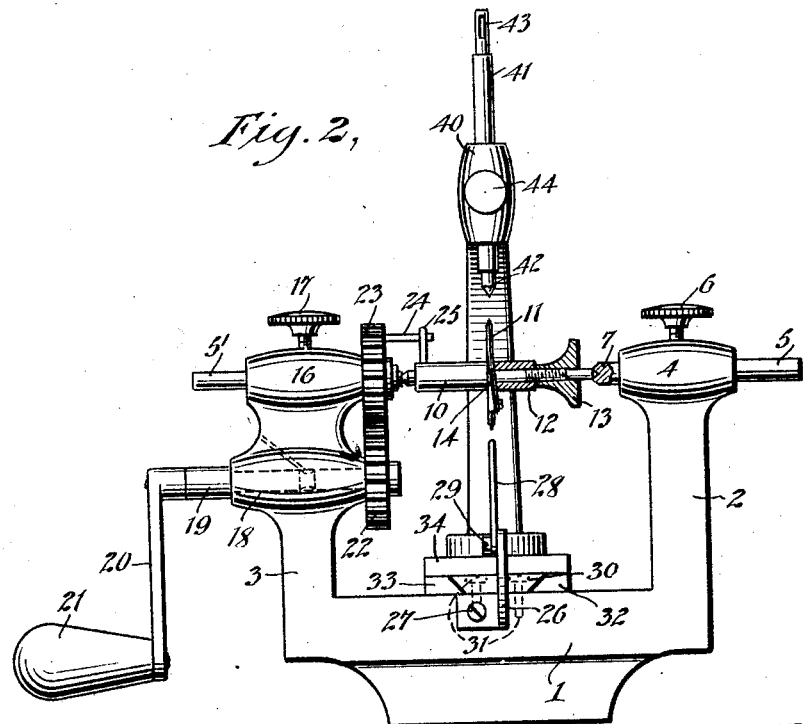
Fig.2,
WITNESSES
INVENTOR
J. L. Limeres
BY
ATTORNEYS Oct. 16, 1928.
1,688,243
J. L. LIMERES
MACHINE FOR ROUNDING GEAR WHEELS
Filed June 15, 1927    2 Sheets-Sheet 2
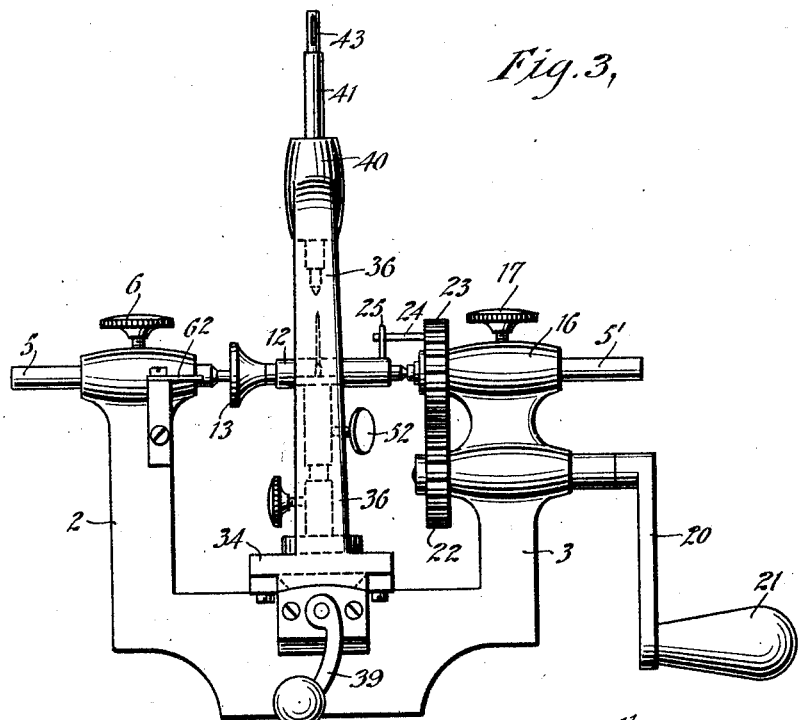
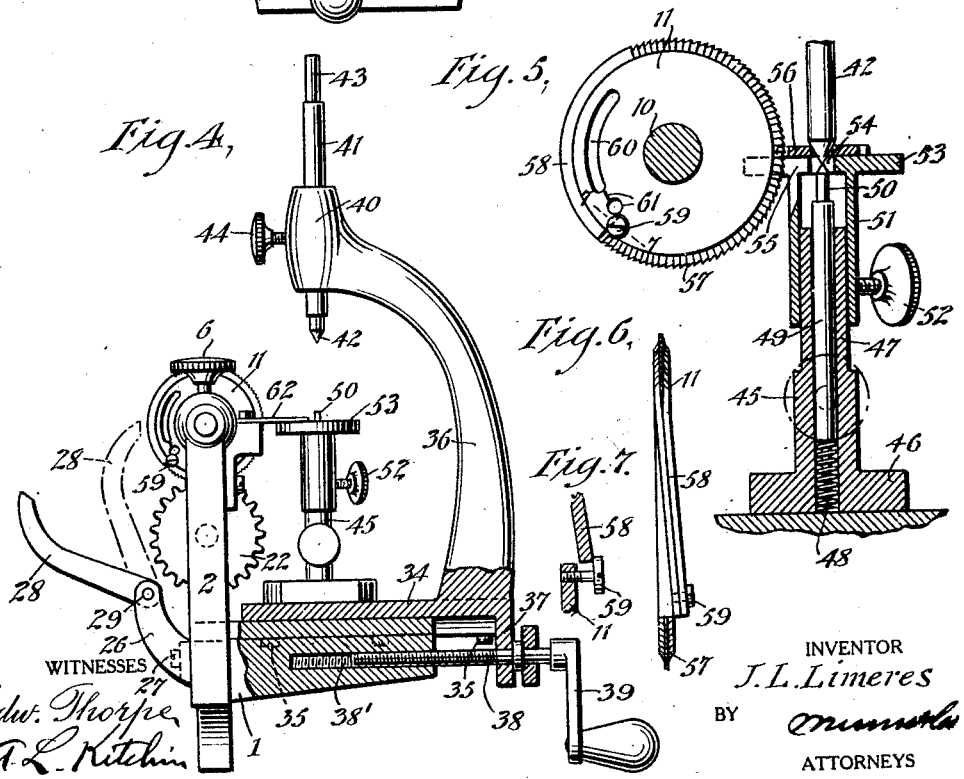
INVENTOR
J. L. Limeres
BY
ATTORNEYS
WITNESSES Patented Oct. 16, 1928.

1,688,243

UNITED STATES PATENT OFFICE

JESUS LOPEZ LIMERES, OF HABANA, CUBA.

MACHINE FOR ROUNDING GEAR WHEELS.

Application filed June 15, 1927. Serial No. 199,050.

This invention relates to machines for rounding gear wheels, and has for an object to provide an improved simple construction which may be operated with power if desired, though ordinarily hand operated, and when operated, functioning to true up the shape of gear teeth and to round the wheel.

A further object of the invention is to provide an improved hand operated instrument which may be actuated at different speeds, and which will accurately true op or round a gear wheel by removing particles therefrom so that all of the openings between the teeth will be of the same depth.

A further object, more specifically, is to provide a machine for rounding gear wheels, wherein a specially constructed cutter is presented having cutting teeth on the periphery merging into a shifting extension for cutting and then shifting a gear wheel being operated upon.

In the accompanying drawings—

Figure 1 is a top plan view of a machine, disclosing an embodiment of the invention.

Figure 2 is a front view of the machine shown in Figure 1.

Figure 3 is a rear view of the machine shown in Figure 1.

Figure 4 is a side view of the machine shown in Figure 1, certain parts being broken away.

Figure 5 is an enlarged fragmentary sectional view illustrating the gear wheel supporting structure and a co-acting cutting wheel.

Figure 6 is an edge view of the cutting wheel shown in Figure 5.

Figure 7 is an enlarged fragmentary sectional view through Figure 5 on line 7—7.

Referring to the accompanying drawings by numerals, 1 indicates what may be called a base or body which has upstanding arms 2 and 3 preferably integral therewith. The arm 2 has a bearing box 4 for accommodating the sliding shaft 5, which when properly adjusted, is clamped firmly in position against movement by the set screw 6. The shaft 5 is provided with a socket 7 at the inner end for receiving the pointed end 8 of the extension 9 of shaft 10. The extension 10 carries the cutting wheel 11 hereinafter fully described. The sleeve 12 is slidingly mounted on the extension 9 and is pressed tightly against the wheel 11 by a hand operated nut 13 threaded onto the extension 9. As extension 9 is smaller than the shaft 10, a shoulder 14 is provided against which the sleeve 12 presses the wheel 11 and thereby rigidly connects the wheel with shaft 10. The shaft 10 has a pointed auxiliary reduced end 15 fitting into a suitable socket in the shaft 5', which shaft is slidingly mounted in the bearing box 16 formed integral with the arm 3. A set screw 17 acts to clamp the shaft 5' against external movement. Arm 3 is provided with a second bearing box 18 which accommodates a shaft 19 to which the crank 20 is secured. This crank is provided with a handle or grip 21 whereby shaft 19 may be rotated. A gear wheel 22 is rigidly secured in any desired manner to shaft 19 and meshes continually with the gear wheel 23 rotatably mounted on shaft 5'. A pin 24 is rigidly secured in any desired manner to the gear wheel 23 and extends to a position for striking the pin 25 rigidly secured to shaft 10, whereby when gear wheel 23 is rotated, shaft 10 will also be rotated.

A bracket 26 is rigidly secured to base 1 in any suitable manner, as for instance, by screw 27, said bracket being positioned so that the pointer or finger 28 pivotally connected to the bracket by the screw 29, will be positioned centrally of base 1, whereby the operator may know when the cutter 11 is properly centered. The finger 28 is moved over to the dotted position shown in Figure 4 when centering the cutter 11 and is moved back to the full line position shown in Figure 4 before the crank 20 is operated. In order to center the cutter 11, the set screws 6 and 17 are loosened and the shafts 5 and 5' are slid longitudinally until cutting wheel or cutter 11 has been properly centered, after which the set screws 6 and 17 are again tightened. This will lock the parts in a proper centered position so that one or more gear wheels may be operated on as desired.

As indicated in Figures 2 and 4, a dove-tail plate 30 is secured to base 1 by suitable screws 31 or other means, said plate being positioned so that inclined sides will co-act with the underlapping members 32 and 33 of the sliding plate 34. The members 32 and 33 may be secured to plate 34 by screws 35 or by welding or other means as desired. The plate 34 is preferably integral with the sliding arm 36, though it could be made separate and rigidly secured in place. An extension 37 depends from the lower part of arm 36, said extension having an aperture for accommodating the threaded shaft 38 which is screwed into the threaded socket 38' formed in the base 1. Whenever crank 39 is operated for rotating the threaded shaft 38, arm 36 and associated parts will be moved. Arm 36 at the upper end is provided with an enlargement 40 through which the shaft 41 extends, said shaft preferably having a reduced and pointed end 42 and an apertured end 43. A set screw 44 acts to lock the shaft 41 in any set position. Arranged beneath the shaft 41 and on the plate 34, is what may be termed a wheel supporting carriage 45. This carriage is provided with a base 46 secured by screws or otherwise to the plate 34, said base 46 merging into a hollow standard 47, said standard accommodating a spring 48 acting continually on the shaft 49, which shaft extends beyond standard 47 and is provided with a pointed reduced end 50. A sleeve 51 is slidingly mounted on the standard 47 and is locked in different vertical adjustments by a thumb set screw 52. Sleeve 51 is provided with a top plate 53 which is provided with a bore 54 merging into the slot 55. When in use, a gear wheel 56 rests on the plate 53 and is held centered thereon by the reduced extension 50 and the reduced end 42. Though the gear wheel being treated is held properly centered on the plate 53, it may freely rotate as the cutter 11 functions.

As heretofore described, the cutter 11 is clamped in position on the shaft 10 so as to rotate therewith. As indicated in Figures 5 to 7 inclusive, the cutter 11 is a disk of metal with teeth 57 on the periphery and on each side adjacent the periphery for approximately three-fourths of the circumference. For approximately one-fourth of the circumference, there is provided a deflected section 58. This section is normally deflected for an appreciable distance but may be adjusted by the screws 59 to present the desired deflection equivalent to the distance between the teeth of the gear wheel 56. Where these teeth are small, screw 59 is screwed down until the deflection is exactly in proportion to the distance of the centers of the teeth. After this has been done, the gear wheel 56 is moved over to substantially the position shown in Figure 5 by the actuation of the crank 39. As the cutter 11 continues to rotate, the teeth 57 will true up the various teeth and properly round the wheel 56. The section 58 acts as a member for advancing gear wheel 56 one tooth upon each rotation of the cutter 11, whereby the teeth 57 on each revolution may operate in a new space between the teeth of the gear wheel. One revolution of the gear wheel 56 when the parts are arranged as shown in Figure 5, is sufficient to true up the teeth and remove any burs or objectionable matter and also sufficient to round up the wheel, though if by accident crank 20 is rotated sufficiently to cause the gear wheel 56 to make two or more revolutions, no damage will be done. In regard to section 58, it will be noted that the same is integral with the body of the cutter 11 but is allowed to flex by reason of the slot 60 and the cuts or openings 61. By this formation, the section 58 is really a tongue capable of being deflected to different degrees to take care of different size teeth so that gear wheels having different size teeth may be properly rounded. After a gear wheel has been properly rounded, crank 39 is rotated in a reverse direction for moving the plate 34, carriage 45 and associated parts away from the cutter 33 so that a new gear wheel may be placed in position. When adjusting the plate 53 which receives the gear wheel 56, the same is preferably moved upwardly until it lightly contacts with a small swinging arm 62 shown in Figure 4. After the plate 53 has been properly adjusted, arm 62 is swung out of the way and then the device may be operated as described.

What I claim is:

1. A machine for rounding gear wheels, comprising a base, a pair of arms extending upwardly from said base, one of said arms having a single journal box and the other an upper and lower journal box, a sliding shaft mounted in said upper journal box, a second sliding shaft mounted in the journal box of the opposite arm, means for locking said shafts against sliding movement, a power shaft mounted in said lower journal box, a crank connected to said power shaft, a gear wheel rigidly secured to said power shaft, a gear wheel rigidly mounted on the shaft mounted in said upper journal box, said gear wheel meshing with the first mentioned gear wheel, a pin extending from said second mentioned gear wheel, a cutter shaft rotatably supported by the first two mentioned shafts, a pin extending from said cutter supporting shaft, said pin extending into the path of movement of the pin carried by said gear wheel whereby when said gear wheel is rotated the cutter shaft will be rotated, a cutter mounted on said cutter shaft, means for clamping said cutter rigidly to said cutter shaft, a carriage for supporting a gear wheel, means for centering the gear wheel on said carriage, and means for moving the carriage so that the gear wheel thereon will be brought into operative position in respect to said cutter whereby when said crank is rotated the cutter will function to cut the gear wheel.

2. A cutter for cutting and trimming gear teeth, comprising a thin flat disk having an arc-shaped slot near the periphery and a slit at one end of the slot extending from the slot to the periphery, the portion of the disk between the slot and the periphery being smooth and permanently deflected to one side so as to present a guiding section, said disk being formed with a cutting section, said cutting section containing all the periphery except said guiding section, said cutting section being provided with teeth on the periphery on each side adjacent the periphery and a screw carried by the disk for deflecting said guiding section toward the plane of the disk so as to accommodate gears having different sized teeth.

JESUS LOPEZ LIMERES.